US005605996A

United States Patent [19]
Chuu et al.

[11] Patent Number: 5,605,996
[45] Date of Patent: Feb. 25, 1997

[54] OXYGEN SCAVENGING COMPOSITION

[75] Inventors: Michael S. Chuu, Northbrook; Thomas T. Tung, Barrington, both of Ill.

[73] Assignee: American National Can Company, Chicago, Ill.

[21] Appl. No.: 214,803

[22] Filed: Mar. 16, 1994

Related U.S. Application Data

[63] Continuation-in-part of Ser. No. 835,716, Feb. 12, 1992, abandoned.

[51] Int. Cl.$^6$ .................................................. C08F 236/00
[52] U.S. Cl. ........................ 526/340; 428/35.2; 525/267; 526/335
[58] Field of Search .......................... 525/267; 428/35.2; 526/335, 340

[56] References Cited

U.S. PATENT DOCUMENTS 4,702,966 10/1987 Farrell et al. .......................... 428/500
5,075,362 12/1991 Hofeldt et al. .......................... 524/72

Primary Examiner—James J. Seidleck
Assistant Examiner—Terressa Mosley
Attorney, Agent, or Firm—Wyatt, Gerber, Burke, & Badie, L.L.P.

[57] ABSTRACT

An Improved Oxygen Scavenging Polymer containing unsaturated carbon-carbon bonds, functions as an antioxidant when the unsaturated carbon-carbon bonds are triggered by the presence of moisture, wherein the unsaturated polymer contains one or more alkyl, alkenyl, or alkynyl groups or combinations thereof, and the polymer is used in articles.

12 Claims, 8 Drawing Sheets

OXYGEN SCAVENGING COMPOSITION

This application is a continuation-in-part of application Ser. No. 07/835,716, filed on Feb. 12, 1992, abandoned entitled "Improved Oxygen Scavenging Composition and Containers Made Therefrom".

BACKGROUND OF THE INVENTION

This invention relates to improved oxygen scavenging compositions and the containers or packages made therefrom. The oxygen scavenging composition is moisture triggerable usually by moisture present during the sterilization process. The containers may be comprised primarily of metal, glass or of polymeric materials and can be either single layer or multi-layer. If made from polymeric materials the laminate frequently will include a barrier layer, for example, a metal foil, ethylene vinyl alcohol or Saran. The containers can be generally cylindrical or bowl shaped containers made by blow molding, injection molding, or injection blow molding. The containers may also be made by thermoforming or any other suitable process. In addition, the containers may be in the form of bottles, jars or similar commonly used container shapes. For additional information on containers which may be used in the practicing of this invention see the application in Docket No. PA1156 entitled EASY-OPEN CLOSURE and Docket No. PA1108 entitled END CLOSURE FOR A CONTAINER, which are owned by the assignee of the present application and which are incorporated herein by reference. Additional containers are disclosed in: U.S. patent application Ser. Nos. 534,200 filed Jun. 6, 1990; 504,175 filed Apr. 4, 1990; 571,856 filed Aug. 23, 1990; 771,643 filed on Oct. 4, 1991; 771,977 filed Oct. 2, 1991; and 769,426 filed Oct. 1, 1991; U.S. Pat. Nos. 4,190,477; 4,311,742; 4,360,550; 4,424,256; and 4,557,377, the disclosures of which are incorporated herein by reference.

The teachings of the present invention are also applicable to glass and metal containers or cans, especially, but not necessarily limited to, containers having a lid comprised of a material that is different in composition from the container body or is comprised of a plastic or polymeric material. Pouches, especially retort packages, trays, cartons and tubes, are also contemplated according to the present invention.

BACKGROUND OF THE INVENTION

Containers used to package comestibles are preferably made with very precise tolerances in the area where the lid, cap or cover is applied so that the body and the lid cap, or cover fit together to make an air-tight seal. An air-tight seal is necessary to prevent stored food from suffering from spoilage or degradation due to oxidation. When metal containers or cans are provided with a metal lid and sealed the problems associated with creating an air-tight seal are not as great since the lidstock and the container body can frequently be "double seamed."

More recently, there has been an interest toward other types of containers besides metal cans. Thus, there has been an interest in various other types of packaging materials, particularly plastic laminates which are useful as replacements for metal cans or where, for example, a microwaveable container is sought. The new types of packaging frequently use polymeric compositions for the lid and container body but they cannot be double seamed as metal cans can be. These polymeric compositions may be either single layer polymeric materials or multi-layer. The lidstock can be made of the same polymeric materials as the container body or different polymeric materials as needs dictate. Glass is also highly advantageous where barrier properties are sought because glass, like metal, has good oxygen and moisture barrier properties.

Since some plastic containers are not readily adapted to being double seamed, another approach must be used to create an air tight seal to protect the packaged contents from coming in contact with outside air. In addition, even in glass and metal containers and plastic containers that are double seamed, during the packaging of some products air can remain in the headspace of the container after sealing. While the quantity of remaining air may be small, its presence can cause off-tastes particularly in oxygen sensitive products such as beer.

Oxygen tight seals for food containers are important to prevent spoilage of the packaged comestibles. Plastic containers may be sealed in a number of ways including double seaming. An alternative approach to double seaming is to spin weld the lidstock to the container body. Other means of sealing include ultrasonic heating, hot melt adhesives, and RF heating. Still another approach is to use solvent welding, although this is not generally preferred because of possible ingress of solvent into the packed product. While prior methods of sealing provide a reasonably good seal between the lidstock and the container body, there is a need to provide containers with better sealing to protect the contents from outside oxygen and oxygen which has been retained inside the container during the sealing process from damaging the product.

Besides polymeric containers with plastic lids, there are numerous other types of containers which require excellent air-tight seals. These include polymeric containers with metal lids and metal containers with polymeric lids that require good sealability and protection from oxygen but which are incapable of being double seamed like two piece metal cans. The term polymeric lid or lidstock refers not only to a single layer rigid plastic lid but also includes multi-layer rigid plastic lids, and single layer and multi-layer flexible lids. The multi-layer lids generally have: a polymeric layer which is intended to be in contact with the container body, a barrier layer which may for example be a metal foil such as aluminum, or a polymeric barrier layer such as ethylene vinyl alcohol or polyvinylidene chloride copolymers. There may also be a polymeric layer as the outer layer of the lid.

The benefits of double seaming are also not available where glass bottles are being used with a metal or plastic lid such as, for example, a screw type cap. Although glass and metal are good barriers to oxygen, the weakness in any air-tight seal is in the area where the two different materials are to be joined. The differences in the type of materials make it difficult to ensure that a completely air tight seal is present. This is particularly true for screw type caps where the application of further sealing materials are not desired because it will make it difficult for the user to open the container. Thus, there is a need for improved means to seal containers to prevent ingress of oxygen into the container or to reduce the amount of remaining residual oxygen in the container after sealing.

It is known in the art to use certain unsaturated polymers as gaskets or as seals on sealants in containers to provide airtight containers. These polymers have been found to be subject to hardening and cracking thus losing the ability to provide an airtight seal. As a result, these polymers have been provided with an anti-oxidant to prevent cracking and brittleness.

Oxygen barriers are important in the packaging of many comestibles. Metal cans and glass bottles provide excellent oxygen barrier properties. With respect to plastic containers, the polymeric materials used in such containers generally do not have oxygen barrier properties as good as glass or metal. In order to overcome this problem, plastic containers, including plastic lidstock, are generally provided with one or more barrier layers of a metal foil, ethylene vinyl alcohol (EVOH) or Saran.

By providing a container that is relatively impermeable to oxygen through the wall of the container the food or beverage that is packed therein is protected from deterioration due to oxidation. It has been recognized that oxygen barriers in polymeric containers or lidstock do not completely protect against the possibility of oxidation. Accordingly, the use of oxygen scavenging systems has been suggested in multi-layer polymeric constructions in order to absorb any oxygen which might pass through the barrier or remained in the head space above the packed or processed food.

For example, U.S. Pat. No. 4,048,361 to Valyi discloses a food container formed with a barrier material inside of which is a carrier layer containing a "getter". The "getter" may be an absorbent for any gas which permeates the barrier layer. In an alternate approach, Valyi includes a barrier layer on both sides of the carrier layer whereby oxygen leaving the food or coming from the outside will be absorbed by the "getter".

Vijlbrief, U.S. Pat. No. 4,586,514 discloses the use of antioxidizing agents mixed within a plastic barrier layer of a container to reduce the permeation of oxygen to the oxidizable material, such as beer, within such a container.

U.S. Pat. No. 4,536,409 to Farrell discloses a polymeric laminate having solid layers with at least one polymeric protective layer in a protective relation to an oxygen scavenger material in another layer of the laminate. The oxygen scavenger is incorporated in a polymeric layer. The protective layer is substantially resistant to permeation by water at ambient temperature and has enhanced transmission of water at elevated temperatures.

In a patent related to the Farrell patent discussed above, U.S. Pat. No. 4,702,966 to Farrell, there is disclosed an article comprised of a polymeric protective material with a dry oxygen scavenger incorporated therein. The oxygen scavenger material is capable of a passive state for prolonged periods of time during which the oxygen scavenger will not directly react with oxygen and is triggered to an active state when moistened by water which has permeated the protective material.

Hofeldt, U.S. Pat. No. 5,075,362 discloses a sealing composition for a container closure. The sealing composition comprises a polymeric matrix material. The preferred oxygen scavenger is an ascorbate, preferably, sodium ascorbate.

Cook, U.S. Pat. No. 3,429,717, discloses a barrier of Saran flexible film sandwich, such as that used to wrap food, with an antioxidant uniformly distributed in a solvent between the layers of Saran. The antioxidant selected for use by Cook depends upon the film as well as the product to be contained and the light and heat conditions to which the package will be exposed.

Yoshikawa teaches in U.S. Pat. No. 4,113,659 that the amount of ammonium salts or water in an oxygen scavenger can lengthen the period before the oxygen scavenger becomes effective. Put in another way, Yoshikawa teaches that the addition of more water or ammonium salts to the oxygen scavenger will extend the period of latency. Yoshikawa only teaches a period of latency of up to twenty hours. As may be appreciated, such a latent period is impractical from the standpoint of commercial reality for a food container that may be stored in a warehouse for extended periods of time before being filled.

Various oxygen scavengers are also known in the art. An early teaching is the Loo et al. U.S. Pat. No. 2,825,651, where the oxygen remover system includes hydrates. For example, an anhydrous sodium sulfite catalyzed by copper sulfate pentahydrate. Such an oxygen remover is included as a pallet inside of a protective package and is placed in the container head space. The problems of practicing the Loo et al. patent are pointed out in the Yoshikawa patent.

Scholle, U.S. Pat. No. 4,041,209 discloses an aqueous solution of a reducing sulfite salt disposed between a high barrier outer layer and a low barrier inner layer thus permitting the oxygen to permeate outward from the head space but retarding oxygen flow from outside inward.

U.S. Pat. No. 3,164,486 to Pezzato discloses liquid gaskets for container closures. The liquid gasket compositions of Pezzuto are based on water dispersions of elastomeric polymers called latices. Natural rubber latices as well as butadiene-styrene copolymers may be used as the polymer in the dispersion. Additives such as gums, resin vulcanizing agents and antioxidants may be included with the liquid gasket.

U.S. Pat. No. 3,411,650 to Mumford discloses elastomeric gaskets of natural rubber or synthetic rubbers such as butadiene-acytonitrile or butadiene-styrene rubbers. The gaskets have a plastisol composition such as a vinyl plastisol applied.

U.S. Pat. No. 4,872,573 to Johnson relates to moldable plastic closures of a selectively foamed, unitarily molded layer and at least one layer of barrier resin adapted to retard migration of oxygen containing gases. The preferred barrier resin is an emulsion of a barrier resin such as EVAL (an ethylene vinyl alcohol).

Another Johnson patent, U.S. Pat. No. 4,879,138, relates to a moldable and formable thermoplastic resin comprising primarily a moldable polypropylene resin. A rubber and sodium benzoate, which is used as a polymer crystal nucleator, can be added to the moldable resin. The rubber is added to improve the impact properties. The sodium benzoate used in Johnson is a known antioxidant.

In PCT Publication No. WO 91/17044 there is disclosed an oxygen scavenging ascorbate compound. The oxygen scavenger may also be a polycarboxylic or salicylic acid chelate or complex of a transition metal or a salt thereof.

SUMMARY OF THE INVENTION

According to the present invention an improved oxygen scavenger composition of an unsaturated polymer is provided. By the term "oxygen scavenger", what is meant is a material which reacts with oxygen as opposed to an inhibitor which prevents a reaction with oxygen. The oxygen scavenger of the present invention is particularly advantageous because it is triggerable by moisture such as the moisture present during the sterilization process. Thus, the oxygen scavenger of the present invention can remain quiescent for extended periods of time and can be activated by moisture. Also included are containers which use the composition of the present invention.

In one embodiment of the present invention the oxygen scavenging composition is comprised of an unsaturated polymer, i.e., a polymer containing one or more double bonds in its polymeric structure. A preferred unsaturated polymer is a styrene butadiene copolymer or a rubber. Preferred rubbers are natural rubber (NR), styrene-butadiene rubber (SBR) or blends thereof.

In another preferred embodiment the unsaturated rubber is coated with a layer of an unsaturated fat or oil. A preferred unsaturated fat or oil is lecithin.

DETAILED DESCRIPTION OF THE INVENTION

Figure 1:
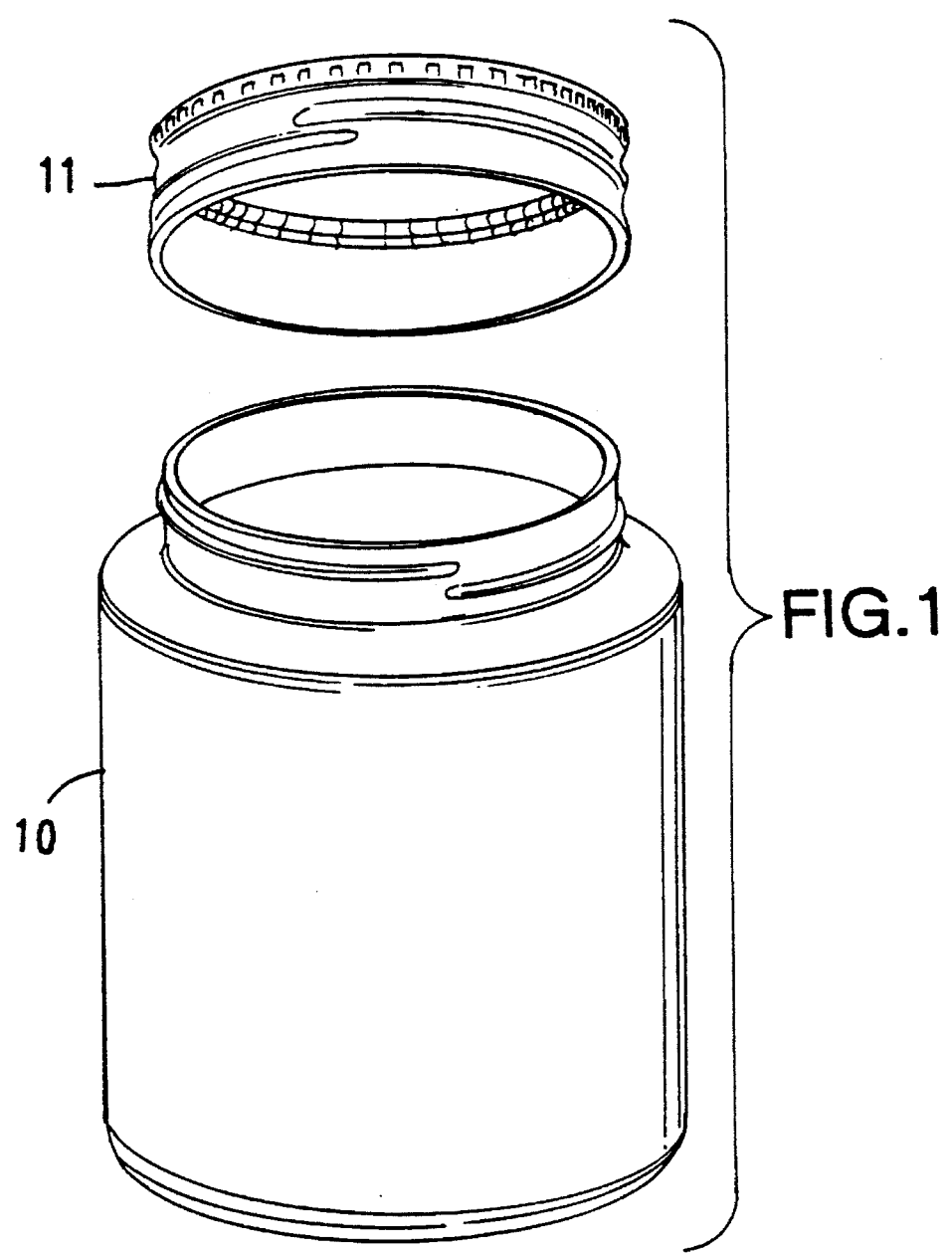
FIG. 1 is a container of the present invention and FIG. 1A shows a gasket of the oxygen scavenger of the present invention.

The present invention is directed to a moisture triggerable oxygen scavenger composition. The composition of the present invention is an unsaturated polymeric material. The unsaturated polymeric material may be a polymer having the following structure:

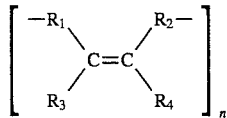

where $R_1$, $R_2$, $R_3$ and $R_4$ are an alkyl, alkenyl, or ankynl groups or combinations thereof and furthermore where $R_3$ and $R_4$ can be hydrogen atoms. $R_1$, $R_2$, $R_3$ and $R_4$ may be the same or different.

In a preferred embodiment $R_1$ to $R_4$ can comprise the following:

$R_1$ has a molecular weight of 14 to 29;

$R_2$ has a molecular weight of 14 to 150;

$R_3$ has a molecular weight of 1 to 300;

$R_4$ has a molecular weight of 1 to 150.

In a more preferred embodiment $R_1$ to $R_4$ can comprise:

$R_1$ has a molecular weight of 14 to 29;

$R_2$ has a molecular weight of 14 to 150;

$R_3$ has a molecular weight of 1 to 220;

$R_4$ has a molecular weight of 1 to 150.

In a most preferred embodiment, $R_1$ to $R_4$ can comprise:

$R_1$ has a molecular weight of 14 to 29;

$R_2$ has a molecular weight of 14 to 100;

$R_3$ has a molecular weight of 1 to 150;

$R_4$ has a molecular weight of 1 to 100.

In a preferred embodiment "n" can be greater than or equal to 30. In a more preferred embodiment "n" can be greater than or equal to 55. In a most preferred embodiment n can be greater than or equal to 80.

In an alternative embodiment the unsaturated polymeric material may be:

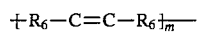

or

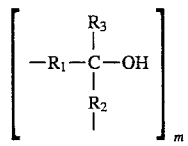

where $R_5$ and $R_6$ may be a alkyl, alkenyl, or alkynl group or combinations thereof. $R_5$ and $R_6$ may be the same or different.

In a preferred embodiment $R_5$ has a molecular weight of 14 to 300 and $R_6$ has a molecular weight of 14 to 150. In a more preferred embodiment $R_5$ has a molecular weight of 14 to 220, and $R_6$ has a molecular weight of 14 to 150. In a most preferred embodiment $R_5$ has a molecular weight of 14 to 150 and $R_6$ has a molecular weight of 14 to 100. The number of repeating units "m" in the polymer are preferably greater than or equal to 30, more preferably greater than or equal to 55 and most preferably greater than or equal to 80.

While aryl groups are generally more stable than alkenyl C=C double bonds, they are not contemplated as being the site of oxidation in the present invention. However, an aryl group can be one of the constituent of $R_1$ to $R_6$ if the aryl group is sufficiently far away from the site of the double bond so as not to interfere with its oxygen scavenging abilities. $R_1$ to $R_6$ can also contain —OH, —C=O and —CHO groups in the chain.

The molecular weight of the preferred unsaturated polymer of the present invention is between about 3,000 to about 2,000,000. In a more preferred embodiment of the present invention, the molecular weight is between about 4,500 to about 1,800,000. In a most preferred embodiment, the molecular weight is 6,000 to 1,500,000.

The method for identifying the molecular weights of the present invention is to average the molecular weight according to the number of molecules of each type to obtain the number average molecular weight $\overline{M_N}$. This is defined in such a way that the total number of polymeric molecules of all types multiplied by $\overline{M_N}$ gives the sum of the products of $M_i$ (the molecular weight of the i-mer) and $N_i$ (the total number of molecules present), i.e.

$$N\overline{M_N} = \Sigma N_i M_i$$

or $$\overline{M_N} = \frac{\Sigma N_i M_i}{N} = \frac{\Sigma N_i M_i}{\Sigma N_i}$$

by using the number distribution of molecular weight table set forth in "An Introduction to Polymer Chemistry" 1967 edition:

| Number Distribution of Molecular Weight | | | | | |
|---|---|---|---|---|---|
| i | $M_i$ | $N_i$ | i | $M_i$ | $N_i$ |
| 1 | 100 | 100 | 11 | 1100 | 35 |
| 2 | 200 | 90 | 12 | 1200 | 31 |
| 3 | 300 | 81 | 13 | 1300 | 28 |
| 4 | 400 | 73 | 14 | 1400 | 25 |
| 5 | 500 | 66 | 15 | 1500 | 23 |
| 6 | 600 | 59 | 16 | 1600 | 21 |
| 7 | 700 | 53 | 17 | 1700 | 19 |
| 8 | 800 | 48 | 18 | 1800 | 17 |
| 9 | 900 | 43 | 19 | 1900 | 15 |
| 10 | 1000 | 39 | 20 | 2000 | 14 |

For example, for the above table, $N_1=100$, $N_2=90$, $N_3=81$, etc. and $M_1=100$, $M_2=200$ and $M_3=300$ etc., $M_N$ could be calculated by the operation implied by the summation sign:

$$M_N = \frac{(100 \times 100) + (90 \times 200) + (81 \times 300) + \ldots + (14 \times 2000)}{100 + 90 + 81 + \ldots 14}$$

$$M_N = 724.66$$

In characterizing a polymer, not only is a measurement of molecular weight desirable but also some indication of the molecular weight distribution. A different approach to determine the molecular weight of the polymer, which is not used in the present invention, is to average the molecular weight according to the weight of molecules of each to obtain the "weight average molecular weight. The most important thing to note when using the average molecular weight is the large difference between that type of average and when using the number average molecular weight detailed above. Therefore, in stating the molecular weight of a polymer, the type of average must also be given. In the present invention, the number average molecular weight is used to determine the molecular weight of the polymer.

It is possible to obtain a value of the parameter of the molecular weight average ($\overline{M_W}$) versus molecular number average ($\overline{M_N}$), which gives a measure of the range of molecular weights. A value close to unity indicates that the molecular weight of the majority of the polymer molecules are closely similar whereas a value of two or greater indicates considerable "polydisperity", that is, the weight species are of the same order. The present invention uses the "polydisperity weight species with the preferred "polydisperity" ratio of the molecular weight average ($\overline{M_W}$) versus molecular number average ($\overline{M_N}$) is between 2 to 15.

| HEATS OF HYDROGENATION OF ALKENES | |
|---|---|
| Alkene | Heat of hydrogenation, kcal/mole |
| Ethylene | 32.8 |
| Propylene | 30.1 |
| 1-Butene | 30.3 |
| 1-Pentene | 30.1 |
| 1-Heptene | 30.1 |
| 3-Methyl-1-butene | 30.3 |
| 3,3-Dimethyl-1-butene | 30.3 |
| 4,4-Dimethyl-1-pentene | 29.5 |
| cis-2-Butene | 28.6 |
| trans-2-Butene | 27.6 |
| Isobutylene | 28.4 |
| cis-2-Pentene | 28.6 |
| trans-2-Pentene | 27.6 |
| 2-Methyl-1-butene | 28.5 |
| 2,3-Dimethyl-1-butene | 28.0 |
| 2-Methyl-2-butene | 26.9 |
| 2,3-Dimethyl-2-butene | 26.6 |

It is also believed that the more polar $R_{1-6}$ is, the less reactive the polymer is.

One preferred unsaturated polymer is a styrene butadine copolymer. Other preferred unsaturated materials include unsaturated rubber compounds such as natural rubber or styrene butadine as well as styrene butadiene rubber copolymer and styrene butadiene rubber. By natural rubber is meant approximately 20% cis-poiyisoprenes and 80% low molecular weight terpene dimer and trimer. Other unsaturated polymers preferably include isoprene such as polyisoprene, diene rubber such as polybutadiene, poly-butadiene, butyl rubber, ethylene propylene terpolymer, propylene oxide rubber, polyacrylic rubber, nitrile rubber, styrene butadiene styrene triblock copolymer.

The oxygen scavenging ability of the unsaturated polymer of the present invention may be enhanced by the presence of metal catalyst. These metal catalysts include ions of Cesium, Cobalt, Copper, Iron, Lead, Manganese, Magnesium, Nickel, Sodium, Tin, Zirconium and Zinc. The metal catalysts that increase the oxygen scavenging ability of the unsaturated polymer are normally present in small amounts in the polymer itself. However, increasing this amount of the metal catalyst increases the oxygen scavenging ability of the unsaturated polymer.

In addition, the oxygen scavenging properties of the unsaturated polymer of the present invention are enhanced by the presence of water.

The mechanism of the present is not fully understood. However, it is believed that the C=C bond forms an ether or carbonyl in the presence of water, thus scavenging the oxygen that is present. In some instances the unsaturated polymer may be cleaved during its oxygen scavenging activity to form aldehydes and ketones which may also react with oxygen further. In some instances the unsaturated polymer may undergo a rearrangement while acting as an oxygen scavenger. By rearrangement, a shift in the location of one or more methyl groups in the polymer is meant.

In some instances alcohols can be suitable oxygen scavengers because they can undergo cleavage to form an acid as follows:

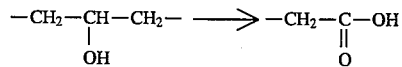

It will be recognized by those skilled in the art that certain C=O containing compounds will not be suitable oxygen scavengers according to the present invention because of their natural stability even though they have a C=O double bond. These include polyvinyl acetate and methacrylate which have the following structure:

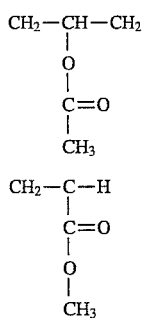

However, a vinyl acetate group having the following structure will be a suitable oxygen scavenger:

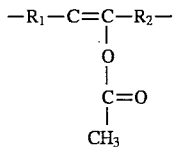

where $R_1$ and $R_2$ are alkyl, alkenyl or alkynl groups or combinations thereof. Polyvinyl acetates and methacrylates will not be suitable oxygen scavengers because the C=O is very stable. It is only where the C=O portion of the chain undergoes clevage to form a carboxylic acid that C=O group would act as an oxygen scavenger.

In a preferred embodiment of the present invention, the unsaturated polymer is coated with a layer of unsaturated fat or oil. Coating may be accomplished by spraying, brushing, or roller coat printing. The unsaturated fat or oil can be whipped with a gas to form a foam for a greater surface area. A preferred unsaturated fat or oil is a phosphoglyceride, phospholipid or phosphotide. Lecithin is a phosphatidylcholine. Alternatively, the lecithin and the unsaturated polymeric material may be emulsified together to form the oxygen scavenger material.

Lecithins are mixtures of diglycerides of fatty acids linked to the choline ester of phosphoric acid.

The lecithins are phosphoglycerides or phosphatides i.e. phospholipids. Preferably, the lecithin used in the present invention is a mixture of acetone insolvable phosphatides. Other suitable phosphoglycerides include phosphatidyletha-olamine (cephalin). Both alpha and beta lechithin and alpha and beta cephalin are suitable. Fatty acids are also suitable to enhance the oxygen scavenging properties of the unsaturated polymer. These fatty acids include palmeric acid, stearic acid, palmitoleic acid, linolenic acid and $C_{20}$–$C_{22}$ acids. Preferred organic acids have from 2 to 35 carbons. More preferred organic acids have 4 to 25 carbons. Preferred glycerides have from 1 to 5 glycerides in the chain. More, preferred glycerides have 2 to 5 glycerides in the chain.

FIG. 1 shows a container 10 which may be glass metal or of a plastic material. Container 10 is provided with a lid 11. The container may be screw type cap or a single or multi-layer material such as glass or metal or a polymeric material. When it is a polymeric material the container will be either a single layer or a multi-layer. Preferably, at least one layer of the polymeric container will contain a barrier material or be a barrier layer such as a metal foil ethylene vinyl alcohol copolymer or a Saran. The container may be bowl shape, or bottle shape but can also be of virtually any configuration such as a tray. It is contemplated that the present invention also encompass pouches such as retort pouches, cartons such as a milk carton shape, or tubes such as collapsible dispensing tubes. Thus, the containers of this invention can be of any desired shape, e.g., generally cylindrical, generally rectangular (with angled or curved edges), generally box (with angled or curved edges), bowl or tub shaped, or the like. If a container is described herein as "generally cylindrical," it is to be noted that such containers according to this invention need not be perfect or exact right cylinders: they can have a greater radius at an upper portion than the radius at a lower portion; they can have a greater radius at a lower portion than the radius at an upper portion; the bottom or top walls may not be perfectly flat, but may extend inwardly or outwardly; and, the sidewall, either inner or outer, may not be perfectly flat, but may have variations or, can have for instance, a collar or gasket or tab, attached thereto.

Suitable constituents for layers of multi-layer materials for the container of this invention include almost any material conventionally used in the art, e.g., ethylene vinyl alcohol (EVOH), vinylidene chloride copolymers, polyethylene (PE), medium density polyethylene (MDPE), high density polyethylene (HDPE), low density polyethylene (LDPE), linear low density polyethylene (LLDPE), very low density polyethylene (VLDPE), polypropylene (PP), ultra low density polyethylene (ULDPE), propylene ethylene copolymer (PPE), nylon, high impact polystyrene (HIPS), ethylene butene copolymers (EB), polyethylene terephthalate (PET), copolymers of PET or CoPET, polybutylene terephthalate (PBT), copolymers of PBT or CoPBT, MXD6, or ethylene vinyl alcohol (EVA) (in which case, preferably a high VA content EVA, i.e., about 28–35% by weight by weight VA EVA), or the like, or mixtures thereof.

In multi-layer structures a tie or an adhesive may also be present between the layers. Suitable materials for such tie layers or adhesives are known to the ordinary skilled artisan and may include, by way of example, anhydride modified polyolefins (e.g., graft copolymer of maleic anhydride and propylene wherein maleic anhydride moieties are grafted on to polypropylene chains), ethylene acrylic acid (EAA) copolymers, ethylene methyl acrylate copolymers, blends or copolymers of PP and EVA, or other synthetic resinous materials. The selected adhesive should be stable under the conditions the containers of the invention are prepared or used.

For additional information on adhesives, reference is made to commonly owned U.S. patent application Ser. No. 07/458,489, filed Dec. 28, 1989, (incorporated herein by reference). Commercially available products for layers in products of the invention include nylon 6; 11; 12; 6, 12; and 6, 66; ULTRAMIDKR 4600 (BASF), NOVAMID 2030 (Mitsubishi Chem. Co.) DURATHANE (Farbenfabriken Bayer A. G.), "1030" (Unitika, Japan), ZYTEL SUPERTUFF 811 (Du Pont), "4018" (Huels, Germany), and ELY 1256 (Elmser, Switzerland), Mylar, Dalar, Exxon 5610A-2 (blend of PP containing EVA), Admer (Mistui, No. AT469C), Bynel (Du Pont E361 or 3036), Plexar 3342, the Surlyn (Du Pont). Admer, Bynel and Plexar are believed to be maleic anhydride modified polyolefins.

Vinylidene chloride copolymers as mentioned herein include vinylidene chloride vinyl chloride copolymers (VC, HB Sarans, Dow Chemical Co.), and vinylidene chloride methyl acrylate copolymers (MA Saran, Dow 119, Dow Chemical Co.; MA-PVdC copolymers containing essentially no EVA, U.S. application Ser. No. 07/458,484, filed Dec. 28, 1989 and incorporated herein by reference). As to polyvinylidene chloride films and methods of making and using them, attention is further directed to commonly owned U.S. patent applications Ser. Nos. 07/458,485, 07/458,489, and 07/458,490, all filed on Dec. 28, 1989, and each incorporated herein by reference. In vinylidene chloride methyl acrylate copolymers, the methyl acrylate is preferably present in an amount of about 3 to 8% by weight, more preferably from 6 to 8% by weight, based upon total weight. However, the methyl acrylate content can be up to 12% and even up to 15% in some instances.

Vinylidene chloride copolymers and EVOH are useful for comprising the internal layer of a barrier material in the containers of this invention. The term "internal layer" as used herein means that the layer is between two or more layers and is not a surface layer. The nature and number of different layers in containers according to this invention are not critical since the advantages of this invention can be realized for containers made of other plastic materials, as well as those having three, five or more layers. A typical structure for a container is: (outer) PP, or blend of PP and HDPE/Adhesive/Barrier, e.g., EVOH, VC, HB Sarans, MA Saran or MA-PVdC containing essentially no EVA/Adhesive/PP, or blend of PP and HDPE (inner). The PP or blend of PP in the outer, the inner or both the inner and outer layers can be oriented. In a preferred embodiment these layers are oriented to achieve lines of orientation weakness.

Layered structures, films or laminates which can be formed into containers can be formed by any suitable process, including laminations, extrusions, coextrusion blown extrusion, tubular water quench extrusion, extrusion coating, and the like, and combinations thereof. Likewise, the present invention is applicable to any process and apparatus for forming a container, so long as the scores, the internal weakness and means for effectuating opening (e.g., sufficient pulling) thereat can be applied to the containers.

As to extrusion or co-extrusion methods and apparatus for making multiple layer sheet materials, reference is made to commonly owned U.S. patent application Ser. Nos. 07/458, 486, 07/458,487 and 07/458,488, all filed on Dec. 25, 1989, and each incorporated herein by reference. And, as to blended film structures, reference is made to commonly owned U.S. patent application Ser. No. 07/458,489, filed Dec. 28, 1989 and incorporated herein by reference. For further background on films, containers and methods and apparatus for producing them, reference is made to U.S. Pat. Nos. 3,477,099, 4,755,402, 3,558,330, 4,714,638, 4,842, 791, 4,667,454, 4,526,821, 4,745,013, 4,554,190, 4,379,117, and 4,804,510 each of which being incorporated herein by reference.

Furthermore, multi-layer structures, laminates or films, or layers thereof, in this invention, may be oriented, if desired, e.g., for a particular end use or to create the internal weakness, by processes such as blown tubular orientation, stretch orientation, or molecular orientation. For instance, to create the internal weakness, an internal layer can be highly oriented. In a preferred embodiment the neck of a container is oriented by injecting hot plastic into a thin cold mold. They may also be cross-Linked by conventional processes such as by irradiation, heat, or the addition of cross-linking agents.

The containers in this invention are useful for packaging food, for instance prepared food which is ready for microwave-reheating by the consumer. However, the contents of the container are not to be considered a limitation of this invention. Note that if a container is to be used for food, drugs or cosmetics, its constituents should comply with FDA regulations.

Containers of this invention are also useful for retorting, although specific uses for the containers are not to be considered a limitation of this invention. Retorting is a process wherein a sealed container (usually filled with food, medical supplies, blood, etc.) is heated for a sufficient time and at a sufficient temperature to achieve commercial sterilization (see Title 21, C.F.R., Part 113, Definitions, .3), e.g., by heating heated or boiling water, steam, heated steam or pressurized water or steam at a temperature of about 212°–275° F. for a sufficient time, typically from about ½ hour up to two hours, usually less than an hour at a sufficient pressure. The heating of contents of containers of this invention can also be achieved in microwave pasteurization. The contents and the amounts thereof in the container can be factors in the times and temperatures of heating. Although lid 11 is shown as a screw type lid other lids are suitable. Alternative lids can be a rigid or flexible polymeric material that is heat sealed to the surface of the container. Such polymeric lids are preferably of one or more layers, one of which is a barrier layer of, for example, a metal foil, ethylene vinyl alcohol or a copolymer of polyvinylidene chloride copolymers. A suitable polyvinylidene chloride copolymer is a copolymer of polyvinylidene and methylacrylate. A suitable metal foil is aluminium foil. The lidding material, if it is to be heat sealed to the container, will generally have a heat sealable polymeric layer on at least a portion of the side of the film to be adhered to the container.

The oxygen scavenging polymer containing unsaturated carbon bonds can be applied as a coating either by solution or lamination processes onto metal, paper or plastic substrates. To achieve the desirable thickness, one may go through multiple passes to build up the thickness gradually. For those who are skilled in the art, it is understood that, a primer may be used between oxygen scavenging polymer and the substrate to improve adhesion. Furthermore, a protective layer which is permeable to oxygen and water can be applied on top of the oxygen scavenging layer for abusive conditions during handling and applications. The oxygen scavenging polymer can be applied on the surfaces of unfabricated raw stock substrate, as well as their semi-finished products, such as closures or containers. The composite oxygen scavenging structure can also be made into as a gasket insert, or a reactive pouch for eliminating oxygen in a sealed embodiment, such as containers. For practical application, the thickness of oxygen scavenging polymer coating should not exceed 20 mils.

Figure 1A:
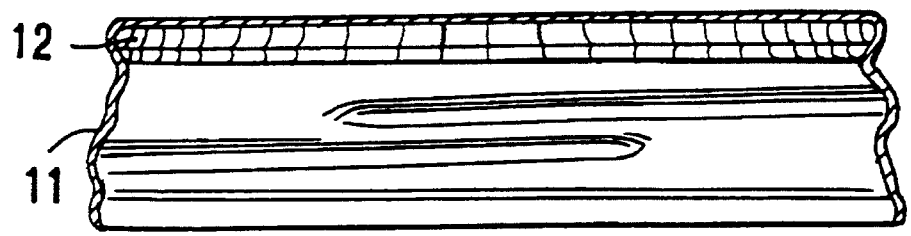
Figure 9:
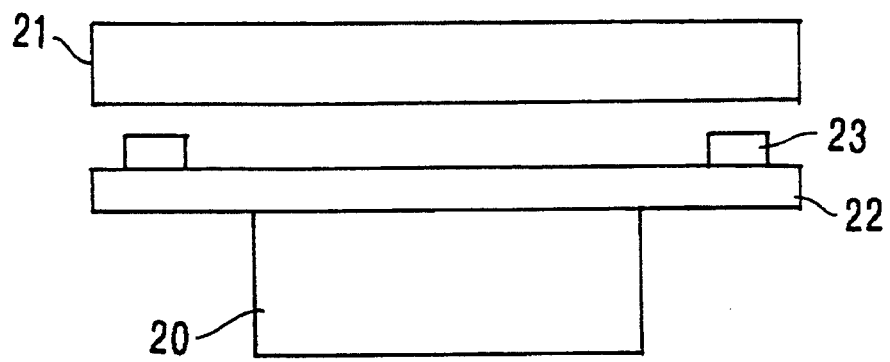
FIG. 9 is a side view of a container with a flexible lid.

Turning again to the Figures, on the inner perimeter of the lid 11 of FIG. 1 and 1A is a gasket 12 which is comprised of the oxygen scavenger of the present invention. A coating for an unsaturated fat or oil is applied to the outer surface of oxygen scavenger 12. When the container has a screw top lid, the oxygen scavenger material can be in the form of a gasket which goes around the inner perimeter of the interior of the screw cap as shown in FIG. 1. Where however, the lid is not a screw type lid but rather, is a heat sealed rigid or flexible lid as shown in FIG. 9, the oxygen scavenger material should be at least in the area where the lid meets and is joined to the container body. This is shown in FIG. 9 where the container body 20 and lid 21 are to be joined at flange 22 about the outer circumference of the container 20. A oxygen scavenging material of the present invention is applied as a ring 23 about the perimeter of flange 22. In an alternative embodiment the ring 23 can be applied so it covers the entire surface of the flange 22.

Figure 10:
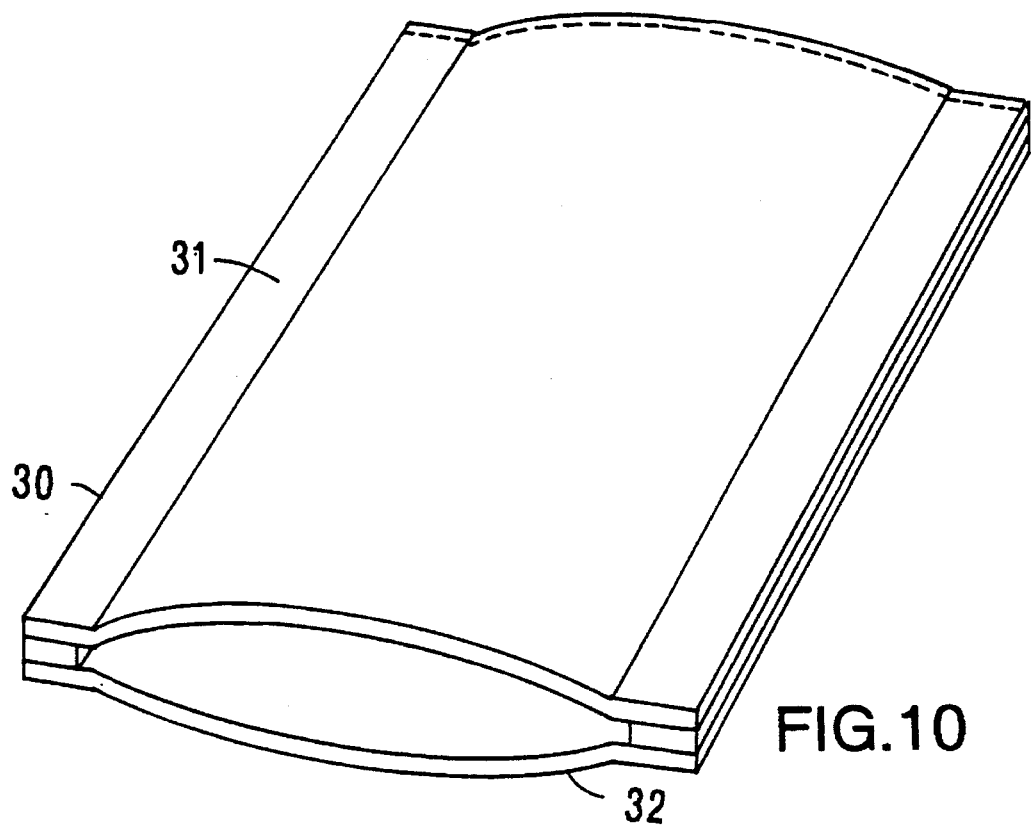
FIG. 10 show a pouch of the present invention.
Figure 11:
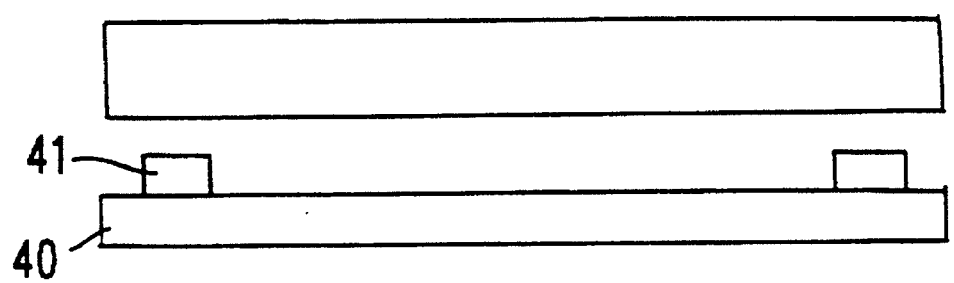
FIG. 11 shows a pair of sheet material about to be formed into a pouch.
Figure 12:
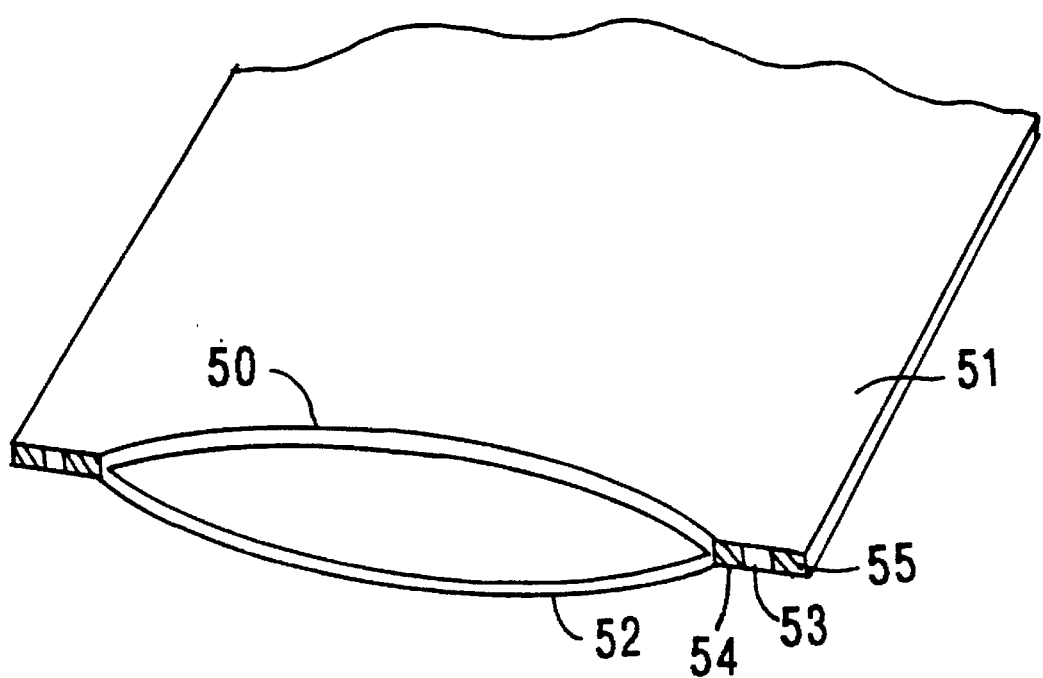
FIG. 12 shows the pouch made from the sheets of FIG. 11.

In another embodiment, either the lid or the flange of the container can be provided with a recessed area where the oxygen scavenger material of the present invention can reside. The lid and container can be sealed by any suitable means conventional in the provided that there are minimal gaps in the oxygen scavenging material. Similarly, when the oxygen scavenger of the present invention is used in a pouch the oxygen scavenger should be applied in the area where one surface of the pouch is joined to other surface. As shown in FIG. 10 there is a pouch 30 having an upper surface 31 and a lower surface 32. The two layers are joined together about their perimeter by the oxygen scavenger of the present invention. In some instances it may be found that the upper and lower surface of the pouch does not bond that well to the oxygen scavenger layer. This problem can be resolved by applying the oxygen scavenger as a thin bead about the surface of one of the components of the pouch. See FIG. 11 where the oxygen scavenger has been placed as a thin bead 41 on the inside surface of the lower component 40 of the pouch. The thin bead goes completely around the perimeter. A good heat seal can then be obtained by sealing the facing heat seal layers of the sheets used to make the pouch as seen in FIG. 12. In FIG. 12 there is a pouch 50 with an upper sheet 51 and a lower sheet 52. The oxygen scavenger 53 is about the perimeter of the pouch. The upper sheet 51 and lower sheet 52 have a heat sealable polymeric material on their inside surfaces so the two sheets may be joined together. After sealing the two sheets become joined together on the outside 55 and partially joined in the inside 54 of the oxygen scavenger 53.

The oxygen scavenger of the present invention may also be used as a chip in a container not necessarily connected to the container or the lid.

While the figures show the oxygen scavenger of the present invention in the area where two items such as the lid and the container body are joined, the present invention is not so limited. The present invention also encompass applying the unsaturated polymer as a coating on the inside of a glass or metal container, or on the under surface of the lid. The present invention also includes using the unsaturated polymer as an inner layer of a multi-layer material such as a multi-layer laminate. The unsaturated polymer may be extruded to form a layer. While it is preferred that the unsaturated polymer of the present invention be a product contact layer, it can also be an inner layer. In those instances where it is an inner layer, the outer layer, which is to be joined to either the remainder of the package, is preferably heat sealable. When used in a tube the present invention can either be a layer in the laminate of the body, a coating on the body or the headpiece, a layer in the headpiece, or a material that covers the orifice.

In order to enhance the oxygen scavenging ability of the unsaturated polymer of the present invention, the surface area of the polymer may be increased. Another approach is to foam the polymer. Foaming is done in the presence of an inert gas such as nitrogen, argon or neon. The foamed structure can absorb moisture during retort which facilitates the oxygen scavenging ability to the unsaturated polymer. Moisture is trapped in the hollow spaces and stays there. When moisture is present it keeps the unsaturated polymer moist to keep reactivity high.

Figure 13:
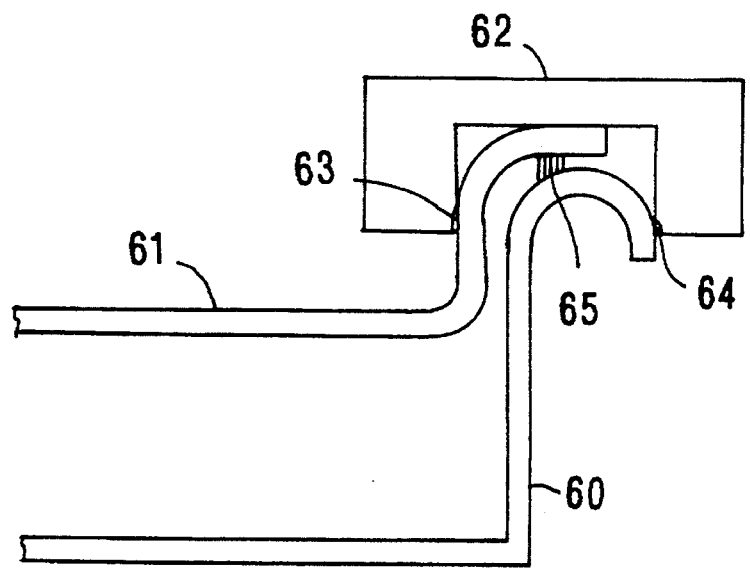
FIG. 13 is a side view of a container with a lid that has a ring to seal the container and lid together.

FIG. 13 shows a container 60 and a lid 61. The two are sealed together hermetically by a ring 62 which may be sealed to the two by any conventional means such as by spin welding at 63 and 64. Rather than have the oxygen seal at the same location as the hermetic seal, in another embodiment the oxygen seal 65 forms a trapped area.

Figure 14:
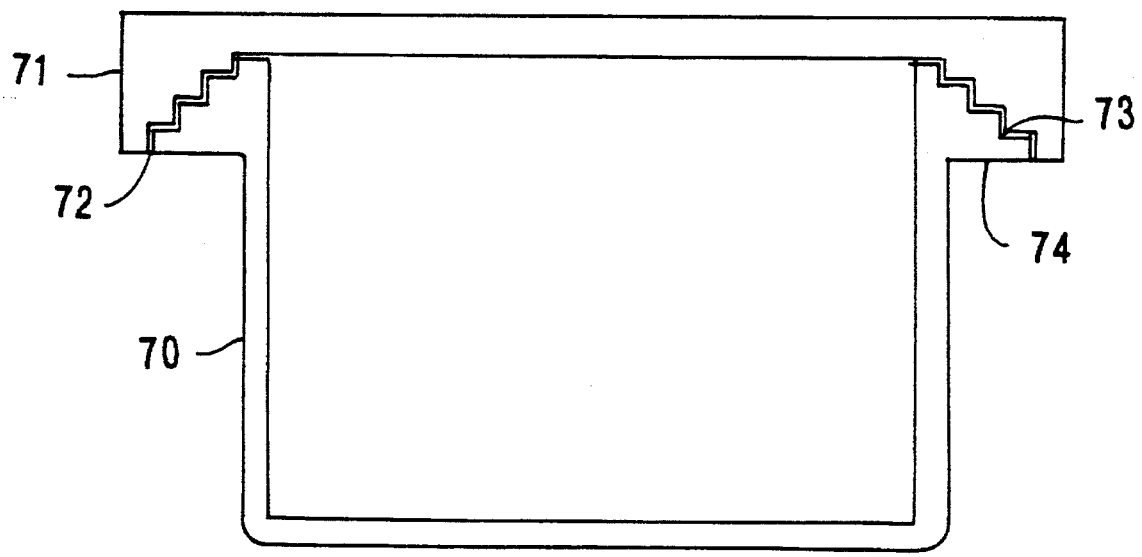
FIG. 14 is a side view of the container and the lid sealed together depicting a staircase effect on the lip of the containers.

Another means of increasing the oxygen scavenging ability is shown in FIG. 14 which depicts a staircase effect on the lip of the container. FIG. 14 depicts a container 70 and lid 71. The oxygen scavenger of the present invention 72 may be applied to the staircase profile 73 of the flange 74 of container 70. This profile and other similar type profiles cause the surface area over which the oxygen scavenger is applied to be increased so that there is better scavenging.

It has surprisingly been found that by using the oxygen scavenger of the present invention, oxygen ingression into the container is absorbed by the unsaturated rubber compounds. Also the oxygen scavenging effect of the rubber compound was accelerated by moisture. The oxygen scavenging effect is triggered usually by moisture during sterilization procedures followed by moisture from food. It was found that the oxygen scavenger of the present invention was most effective when it is under 100% relative humidity saturated moisture vapor. The following table illustrates the oxygen scavenging rate of a styrene butadiene rubber/natural rubber blend at 70° F. and various relative humdities.

TABLE A

| | CC's $O_2$ Scavenged Per Gram of SBR/NR Blend Storage Days (70° F.) | | | | | | |
|---|---|---|---|---|---|---|---|
| Storage RH | 1 | 3 | 6 | 10 | 13 | 20 | 30 |
| 50% | 0 | 0 | 0 | 0 | 0 | 0 | 0 |
| 100% | 0.1 | 1.2 | 6.3 | 10.5 | 12.6 | 18.3 | 23.2 |

As can be seen under 100% relative humidity, the oxygen scavenger of the present invention can remove up to 23.2 cc's of $O_2$ per gram over 30 days of storage at 70° C. As can be also seen from the table, there is no triggering of the oxygen scavenging property of the SBR/NR blend at 50% humidity.

A preferred rubber of the present invention is Dewey & Almy 480T Sealing Compound. While the Dewey & Almy 480T Sealing Compound is normally used to block the passage of air and bacteria, when used it was not known to have oxygen scavenging capability. When using 480T Sealing compound, it is preferred to dry the emulsion to drive out water.

FIGS. 2–8 are ESCA data (electron spectrometry for chemical analysis). The system bounces an x-ray off the polymer and measures the kinetic energy of the rebounding electron from the atom. Then the binding energy ("BE") in electron Volts can be calculated. The binding energy of the electron from the atom is specific for the bonds between each particular pair of atoms. For example, the binding energy of an electron of a carbon is different from the binding energy from an electron of an oxygen.

Note that some of the horizontal axis of the drawings 2–8 are in binding energy while others are kinetic energy.

Figure 2:
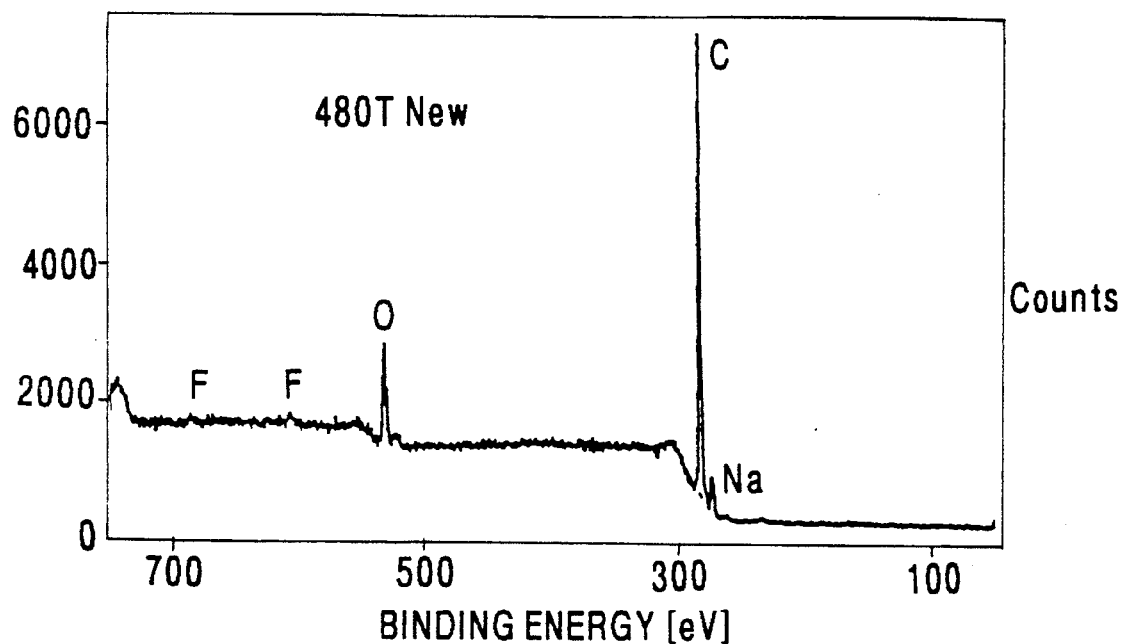
FIG. 2 is an electron spectrometry which measures the binding energy for various atoms in the fresh unoxidized oxygen scavenger of the present invention.

FIG. 2 shows the BE for a variety of atoms in fresh 480T, unoxidized, a few days after the compound is lined and air dried. FIG. 2 shows a comparison of carbon atom counts to oxygen atom counts in the compound at approximately 7,500 to 3,000.

Figure 3:
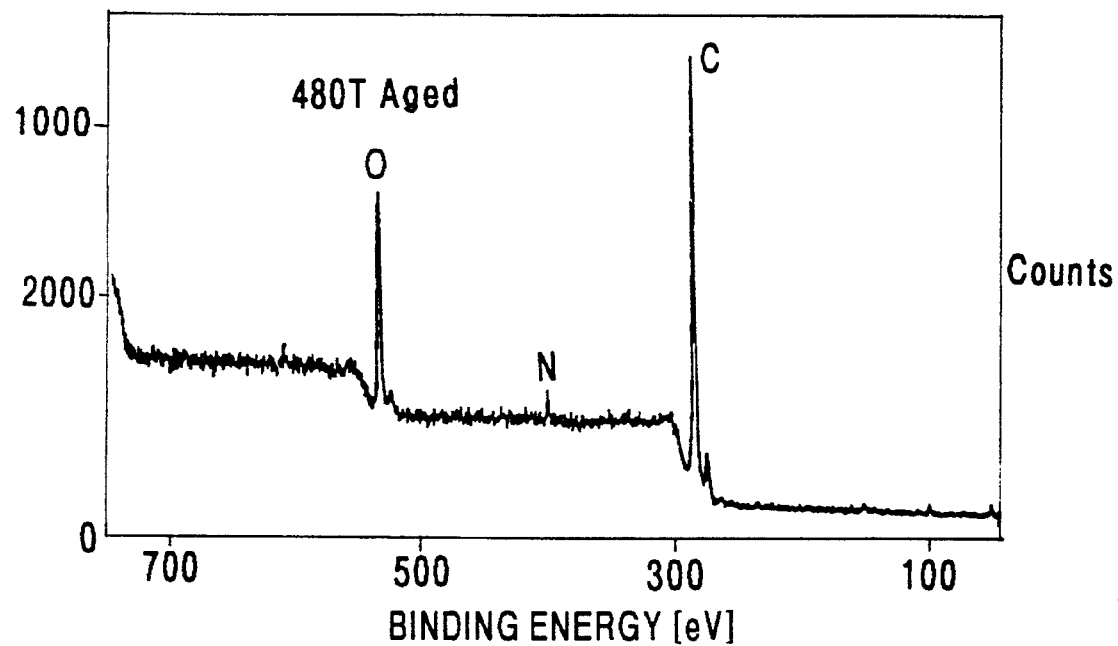
FIG. 3 is an electron spectrometry of aged oxygen scavenger of the present invention at 100% relative humidity after 90 days.

FIG. 3 a graph of aged 480T (100% relative humidity after 90 days), shows a comparison of 4,000 carbon atom counts to approximately 3,000 oxygen atom counts in the compound. The total counts on the graphs depend on the polymer sample surface profile. Thus although total count may not be the same, their profiles can still be compared. FIGS. 2 and 3 show a relative increase in the ratios of oxygen atom counts to carbon atom counts thereby showing the scavenging properties of the polymer sample.

Figure 4:
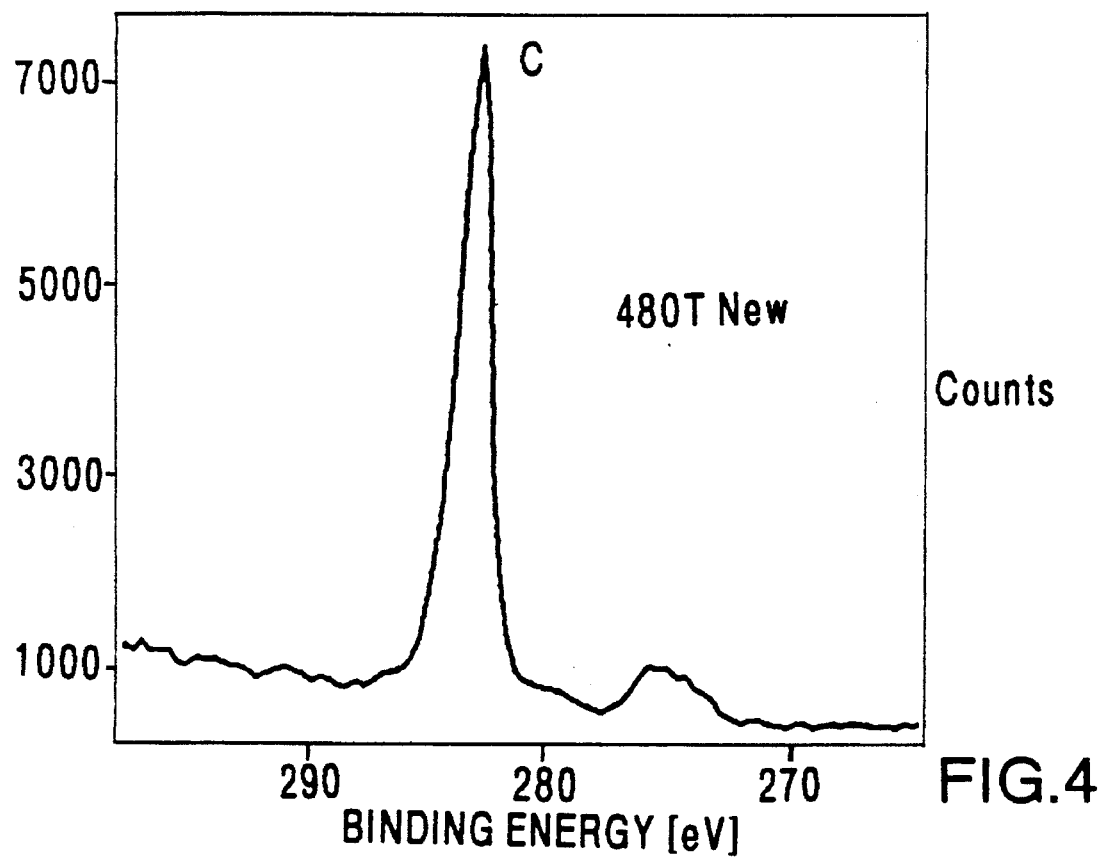
FIGS. 4 and 5 are enlarged views of the carbon peaks of FIGS. 2 and 3 respectively.
Figure 5:
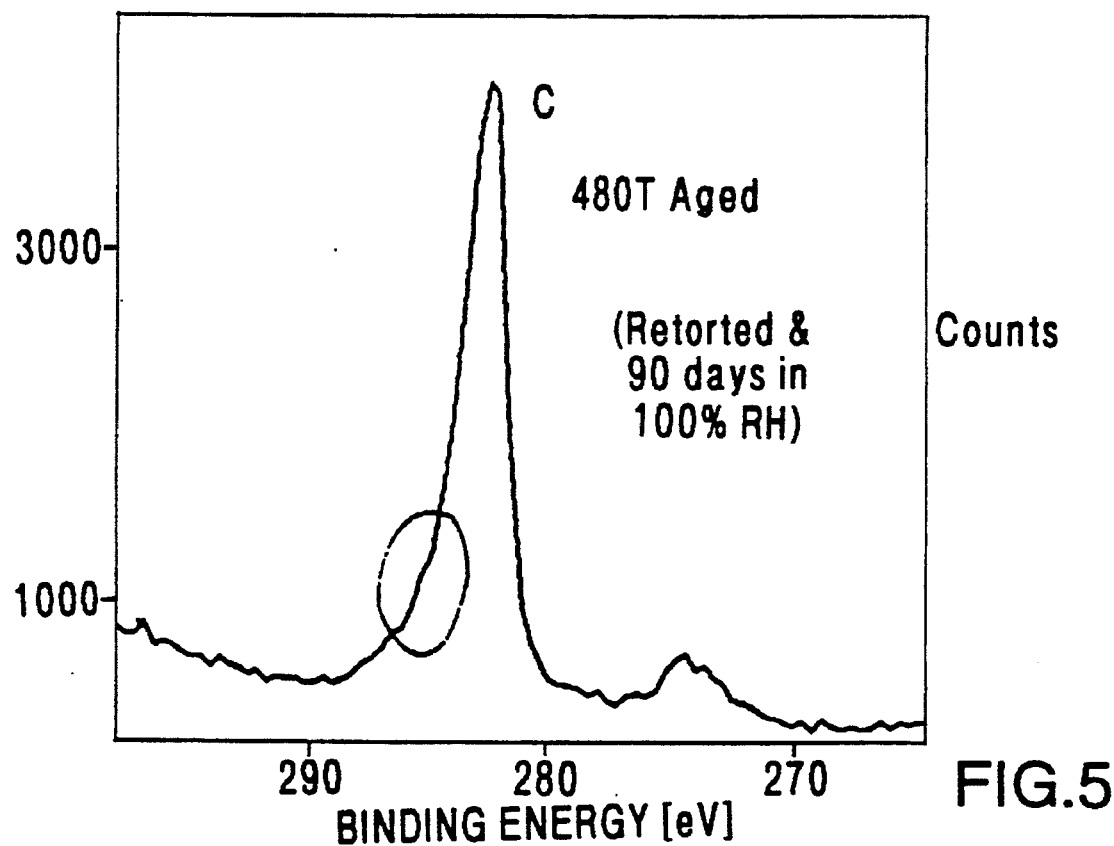

FIGS. 4 and 5 are enlarged views of the carbon peaks of FIGS. 2 and 3, respectively. Note that the aged 480T of FIG. 5 starts to develop a shoulder on the left hand side of the peak, as shown circled on FIG. 5.

Figure 6:
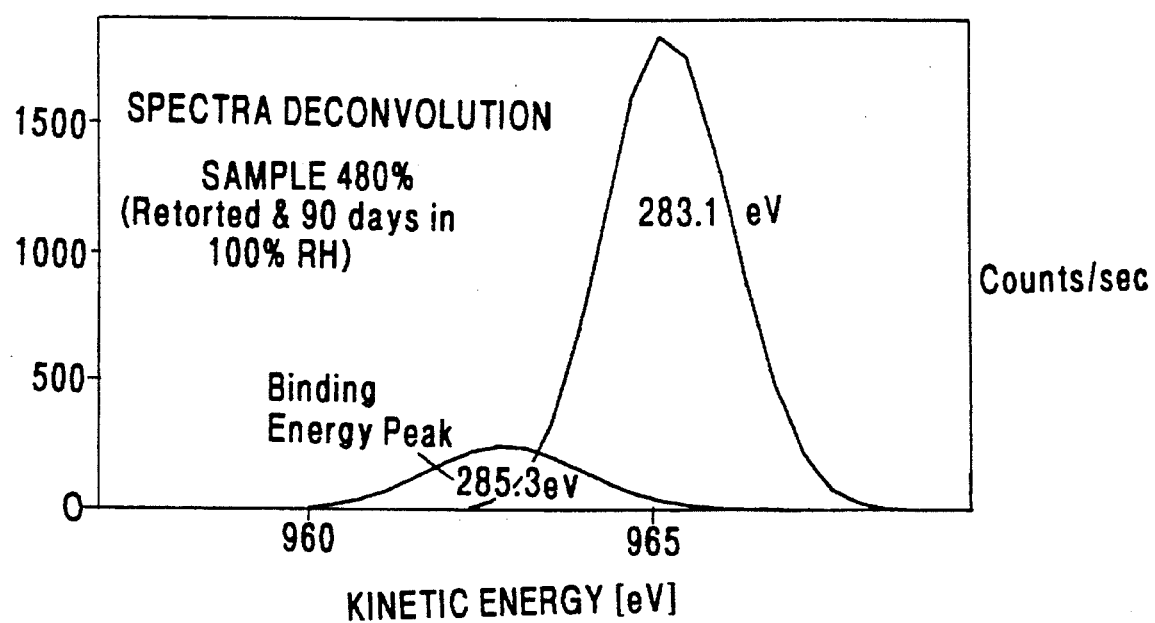
FIG. 6 is a computer deconvolution of FIG. 5 showing two peaks with different bonding energies.

FIG. 6 is a computer deconvolution of FIG. 5. The computer detects that FIG. 5 has hidden a small peak and separates the graph of FIG. 5 into two peaks. This is very important because it shows two peaks with different binding energies.

Note that FIG. 6 has kinetic energy on the horizontal axis but still labels the peaks in binding energy (285.3 eV and 283.1 eV, respectively). This is because the BE is linear with the kinetic energy.

Figure 7:
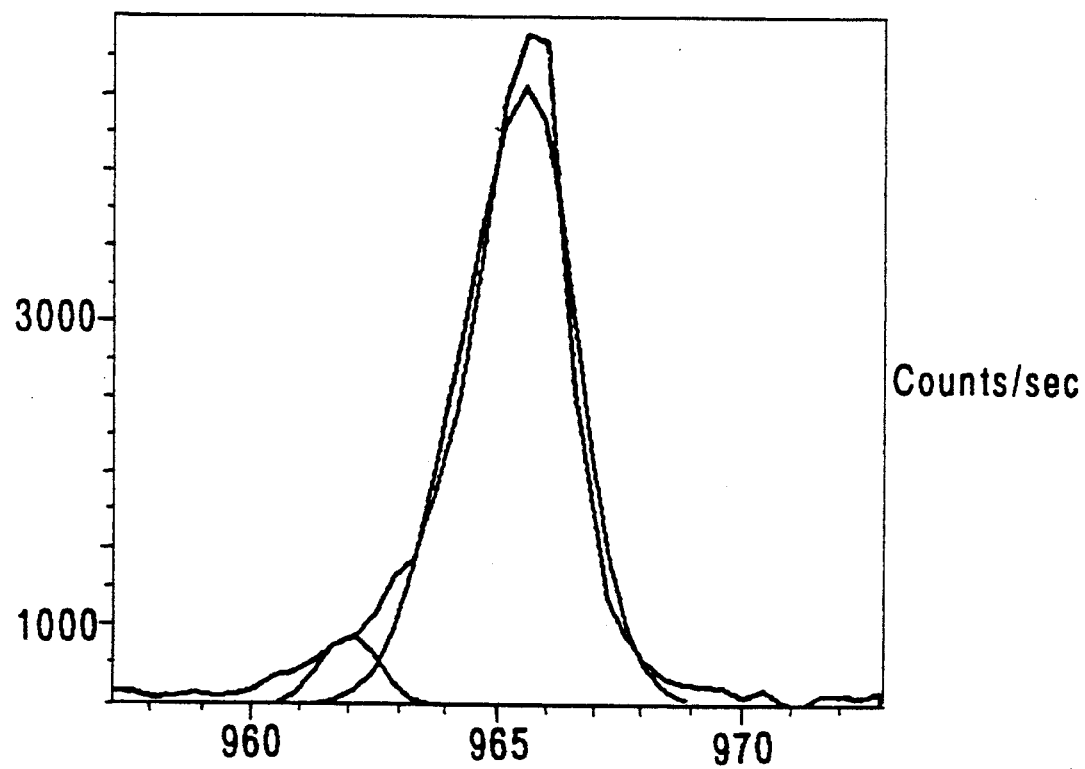
FIG. 7 is a combination view of FIGS. 5 and 6 superimposed on each other.

FIG. 7 combines FIGS. 5 and 6.

Figure 8:
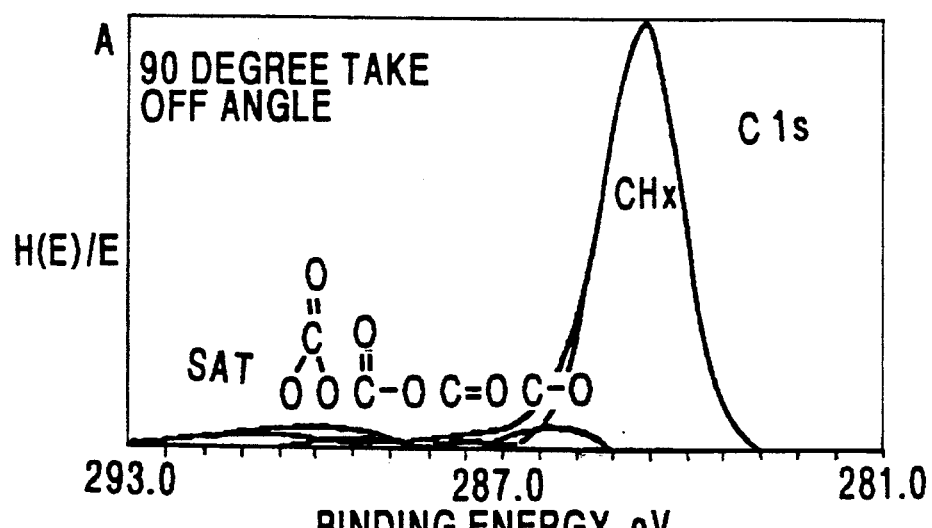
FIG. 8 is a published graph showing the binding energy levels of the carbon atoms in various carbon bonds.

FIG. 8 is a published graph which shows the binding energy levels of the carbon atoms in various carbon bonds. In comparing FIG. 6 with FIG. 8, one can deduce that aged 480T includes C—O, or C=O.

TABLE B

480T OXYGEN TO CARBON RATIOS BY ESCA

| VARIABLE (CONDITION) | O/C RATIO |
|---|---|
| 1. UNAGED | 0.22 |
| 2. AGED IN MASON JAR (100 DAYS IN 100% RH) | 0.54 |
| 3. BATCH 3 (180 DAYS IN 100% RH) | 0.34 |
| 4. BATCH 4 (160 DAYS IN 100% RH) | 0.25 |

The experiment of Table B is run by taking a mason jar, filling the bottom with a few inches of water so that the jar has 100% humidity inside. A sample of 480T, which comes in a liquid emulsion with 63% solids, is dried and hung from the lid of the jar so that a large surface area is exposed. At day 0 the jar contains 21% oxygen. After 100 days the oxygen is measured by measuring the head space and then converting this measurement to the number of cubic centimeters of oxygen that reacted with the compound.

Table B shows the O/C ratio, which actually represents the following for various 480T samples:

$$\frac{\text{oxygen on surface}}{\text{carbon on surface}}$$

Table C shows the calculations of cc's of oxygen that are scavenged by each gram of dried 480T tested with the mason jar method.

TABLE C

OXYGEN SCAVENGING CAPACITIES (cc $O_2$/g) OF DRIED 480T*

| DAYS OF STORAGE | CONTROL (NO COMPOUND) | DRIED 480T |
|---|---|---|
| 27 | 0 | 10.6 |
| 49 | 0 | 14.5 |
| 63 | 0 | 16.0 |
| 91 | 0 | 19.4 |

*Air dried and then retorted at 240° F. for 2 hours.

As shown in Table C, the unsaturated polymer scavenged 10.6 cc's of $O_2$ per gram over 27 days of storage which increased to 14.5 cc's at 49 days, 16 cc's at 63 days and up to 19.4 cc's at 91 days.

Table D compares the oxygen scavenging of lecithin with an ambient relative humidity versus 100% relative humidity.

TABLE D

OXYGEN SCAVENGING CAPACITY (cc $O_2$ /g OF LECITHIN)

| | % RH IN STORAGE | |
|---|---|---|
| DAYS OF STORAGE | AMBIENT RH | 100% RH |
| 12 | 0.16 | 0.28 |
| 20 | 0.25 | 0.43 |
| 28 | 0.29 | 1.0 |
| 70 | 0.61 | 8.3 |

Thus, at 12 days of storage the material scavenged 0.28 cc's of oxygen per gram of lecithin at 100% humidity. This was compared to only 0.16 cc's at ambient humidity. From the 20th to the 28th day there was a considerable increase in the oxygen scavenging ability of the lecithin at 100% humidity compared to ambient humidity as shown in Table D. At 70 days at ambient humidity there was only 0.61 cc's of $O_2$ scavenged per gram of Lecithin compared to 8.3 cc's of $O_2$ per gram of lecithin at 100% relative humidity.

Table E shows the oxygen scavenging capability of wet 480T in ambient relative humidity. The oxygen scavenging is negligible over 91 days of storage. When the 480T is received, it is in an alkaline solution and is 63% solid.

TABLE E

OXYGEN SCAVENGING CAPACITY (cc $O_2$/g OF WET 480T)

| DAYS OF STORAGE | AMBIENT RH |
|---|---|
| 6 | 0.02 |
| 20 | 0.04 |
| 40 | 0.12 |
| 91 | 0.23 |

Table F shows the oxygen scavenging of natural rubber.

TABLE F

OXYGEN SCAVENGING CAPACITY (cc $O_2$/g) OF NATURAL RUBBER

| DAYS OF STORAGE | IN 100% RH |
|---|---|
| 6 | 0.06 |
| 20 | 0.4 |
| 39 | 1.5 |
| 47 | 1.8 |
| 91 | 4.7 |

Table G shows a much higher oxygen scavenging rate for 480T and lecithin combined, than for the sum total of their individual rates. The test of 480T was run in a mason jar as discussed earlier. The test of 480T plus lecithin was run in the same way except that the 480T was first coated with lecithin. However, the lecithin tests were run by placing a liquid lecithin in a test tube, then placing the entire tube in the mason jar. The surface area of the lecithin alone was not compared to the area exposed in the other two experiments.

TABLE G $O_2$ SCAVENGING SYNERGETIC EFFECT OF 480T WITH LECITHIN

| DEWWY & ALMY: | 480T |
|---|---|
| RETORT: | DRIED AT 150° F. FOR 15 MINUTES |
| STORAGE: | 250° F. 75 MINUTES 350 cc WATER INSIDE |
| | 490 cc MASON JAR WITH 20 cc RETORTED WATER INSIDE AT AMBIENT CONDITIONS; MEASUREMENTS WERE TAKEN 6 DAYS AFTER STORAGE (OR RETORT) |

| | 480T | LECITHIN | 480T + LECITHIN |
|---|---|---|---|
| cc $O_2$/g | 1.2 | 0.5 | 5.5 |

As seen in Table G, the amount of cc's of $O_2$ scavenged by the combined use of the unsaturated polymer and lecithin is over 4 times compared to the unsaturated polymer alone and 11 times as great as lecithin alone.

We claim:

1. An oxygen scavenging polymer in an article, where the anti-oxidant property of the article is supplied substantially solely by said polymer in the presence of moisture, said polymer having one or more unsaturated carbon-carbon bonds, wherein said unsaturated carbon-carbon bonds in said polymer operate as an anti-oxidant when triggered by the presence of moisture formed as a result of a sterilization process and wherein said polymer is selected from the group consisting of: styrene butadiene copolymer, styrene butadiene rubber, styrene butadiene rubber copolymer, polybutadiene, butyl rubber, ethylene propylene terpolymer, propylene oxide rubber, polyacrylic rubber, nitrile rubber, and styrene butadiene styrene triblock copolymer.

2. An oxygen scavenging polymer according to claim 1 wherein said unsaturated polymer consists of a chain of monomer units, the monomer units are selected from the group consisting essentially of:

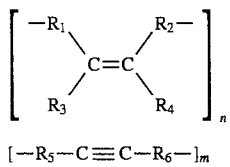

$[-R_5-C\equiv C-R_6-]_m$ and

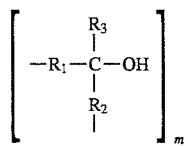

wherein $R_1$ has a number average molecular weight of 14 to 29, $R_2$ has a number average molecular weight of 14 to 150, $R_3$ has a number average molecular weight of 1 to 300, $R_4$ has a number average molecular weight of 1 to 150, $R_5$ has a number average molecular weight of 14 to 300, and $R_6$ has a number average molecular weight of 14 to 150, where $R_1$, $R_2$, $R_3$, $R_4$, $R_5$, $R_6$ contain one or more alkyl, alkenyl, or alkynyl groups or combinations thereof and where $R_3$ and $R_4$ can be hydrogen atoms, and wherein the monomer unit

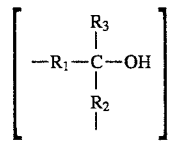

is capable of undergoing cleavage to form at least one carboxylic acid.

3. The oxygen scavenging polymer of claim 2 wherein n is greater than or equal to 30, and m is greater than or equal to 30.

4. The oxygen scavenging polymer according to claim 3 wherein $R_3$ and $R_5$ have a number average molecular weight of 1 to 220.

5. The oxygen scavenging polymer according to claim 4 wherein n and m are greater than or equal to 55.

6. The oxygen scavenging polymer according to claim 5 wherein $R_2$ has a number average molecular weight of 14 to 100, $R_3$ has a number average molecular weight of 1 to 150, $R_4$ has a number average molecular weight of 1 to 100, $R_5$ has a number average molecular weight of 14 to 150, and $R_6$ has a number average molecular weight of 14 to 100.

7. The oxygen scavenging polymer according to claim 6 wherein n and m are greater than or equal to 80.

8. The oxygen scavenging polymer according to claim 7 wherein said unsaturated polymer is a styrene butadiene copolymer.

9. The oxygen scavenging polymer according to claim 8 wherein said styrene butadiene copolymer is styrene butadiene rubber.

10. An oxygen scavenging polymer according to claim 1, wherein said moisture is present as 100% relative humidity saturated moisture vapor formed as a result of a sterilization process.

11. An oxygen scavenging polymer according to claim 1, wherein said moisture is present as a result of a sterilization process followed by moisture from food.

12. An oxygen scavenging composition in an article, said composition comprising a polymer and a metal catalyst, said polymer providing substantially solely the anti-oxidant property of the article, said polymer having one or more unsaturated carbon-carbon bonds, wherein said unsaturated carbon-carbon bonds in said polymer operate as an anti-oxidant when triggered by the metal catalyst.

\* \* \* \* \*